(12) United States Patent
Tredoux et al.

(10) Patent No.: US 10,504,667 B2
(45) Date of Patent: Dec. 10, 2019

(54) SPRING OPERATED ACTUATOR

(71) Applicant: ABB Schweiz AG, Baden (CH)

(72) Inventors: Johannes Tredoux, Ludvika (SE);
Daniel Staffas, Ludvika (SE)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/313,933

(22) PCT Filed: Jun. 26, 2017

(86) PCT No.: PCT/EP2017/065665
§ 371 (c)(1),
(2) Date: Dec. 28, 2018

(87) PCT Pub. No.: WO2018/001940
PCT Pub. Date: Jan. 4, 2018

(65) Prior Publication Data
US 2019/0172660 A1   Jun. 6, 2019

(30) Foreign Application Priority Data
Jun. 28, 2016 (EP) .................................. 16176542

(51) Int. Cl.
*H01H 3/30* (2006.01)
*H01H 3/60* (2006.01)
*F16F 9/14* (2006.01)

(52) U.S. Cl.
CPC .......... *H01H 3/3042* (2013.01); *F16F 9/145* (2013.01); *H01H 3/605* (2013.01); *H01H 3/3026* (2013.01)

(58) Field of Classification Search
CPC .... H01H 3/3042; H01H 3/605; H01H 3/3026; F16F 9/145
See application file for complete search history.

(56) References Cited

U.S. PATENT DOCUMENTS

| 4,678,877 A | 7/1987 | Nicoloso |
| 5,280,258 A | 1/1994 | Opperthauser |

(Continued)

FOREIGN PATENT DOCUMENTS

| CN | 101295602 A | 10/2008 |
| CN | 103388360 A | 11/2013 |
| EP | 2317530 A1 | 5/2011 |

OTHER PUBLICATIONS

European Search Report Application No. EP 16 17 6542 Completed: Nov. 28, 2016;dated Dec. 13, 2016 5 pages.

(Continued)

*Primary Examiner* — Bernard Rojas
(74) *Attorney, Agent, or Firm* — Whitmyer IP Group LLC

(57) ABSTRACT

Actuator and electric switching apparatus including a spring to provide movement of the apparatus and a rotary air damper. The damper is arranged to decelerate the spring during at least an end portion of movement. The damper has a toroidal working chamber formed by two circumferential housing parts rotatable relative to each other. Each housing part has internal walls which together define the working chamber. The first housing part has a rotatable displacement wall, sealingly rotatable in the working chamber. The second housing part has a stationary end wall of the working chamber. The second housing part has one recess in its internal walls. The recess is located less than 90° ahead the end wall as seen is the rotational direction of the displacement wall at an actuating movement. The recess has an extension in the circumferential direction that is larger than the effective thickness of the displacement wall. Alternatively the recess is on the first housing part.

19 Claims, 15 Drawing Sheets

(56) References Cited

U.S. PATENT DOCUMENTS

| | | | | |
|---|---|---|---|---|
| 5,571,255 | A | 11/1996 | Baginski et al. | |
| 6,444,934 | B1 | 9/2002 | Imura et al. | |
| 6,667,452 | B2 | 12/2003 | Spiegel | |
| 7,207,425 | B2 * | 4/2007 | Hayashi | F16F 9/145 188/290 |
| 8,338,732 | B2 * | 12/2012 | Staffas | H01H 33/40 200/400 |
| 8,618,430 | B2 * | 12/2013 | Staffas | H01H 3/3026 200/329 |
| 8,680,414 | B2 * | 3/2014 | Staffas | H01H 3/605 200/400 |
| 9,194,454 | B2 * | 11/2015 | Okimura | B60N 2/20 |
| 2006/0191756 | A1 | 8/2006 | Moradian | |

OTHER PUBLICATIONS

International Search Report and Written Opinion of the International Searching Authority Application No. PCT/EP2017/065665 Completed: Sep. 14, 2017; dated Sep. 28, 2017 11 pages.

The People's Republic of China Office Action and Translation Applicaiton No. 2017800403517 dated Jun. 27, 2019 5 Pages.

The People's Republic of China Search Report and Translation Application No. 2017800403517 Completed: Jun. 18, 2019 4 Pages.

* cited by examiner

SPRING OPERATED ACTUATOR

TECHNICAL FIELD

The present invention relates to a spring operated actuator for an electric switching apparatus including an actuation spring to provide an actuating movement of the switching apparatus and a rotary air damper connected to the actuation spring, which damper is arranged to decelerate the spring movement during at least an end portion of the actuating movement, the damper having a toroidal working chamber formed by a first and a second circumferential housing part which are rotatable relative to each other, each housing part having internal walls which together define the working chamber the first housing part having a rotatable displacement wall, sealingly rotatable in said working chamber, the second housing part having a stationary end wall of the working chamber. According to a second aspect of the invention it relates to a switching apparatus.

BACKGROUND

In a power transmission or distribution network, switching apparatuses are incorporated into the network to provide automatic protection in response to abnormal load conditions or to permit opening or closing (switching) of sections of the network. The switching apparatus may therefore be called upon to perform a number of different operations such as interruption of terminal faults or short line faults, interruption of small inductive currents, interruption of capacitive currents, out-of-phase switching or no-load switching, all of which operations are well known to a person skilled in the art.

In switching apparatuses the actual opening or closing operation is carried out by two contacts where normally one is stationary and the other is mobile. The mobile contact is operated by an operating device which comprises an actuator and a mechanism, where said mechanism operatively connects the actuator to the mobile contact.

Actuators of known operating devices for medium and high voltage switches and circuit breakers are of the spring operated, the hydraulic or the electro-magnetic type. In the following, operating devices will be described operating a circuit breaker but similar known operating devices may also operate switches.

A spring operated actuator or spring drive unit as it is also called, generally uses two springs for operating the circuit breaker; an opening spring for opening the circuit breaker and a closing spring for closing the circuit breaker and re-loading the opening spring. Instead of just one spring for each one of the opening spring and the closing spring, sometimes a set of springs may be used for each one of the opening spring and the closing spring. For example, such a set of springs may include a small spring arranged inside a larger spring or two springs arranged in parallel, side by side. In the following, it should be understood that when reference is made to the spring of the respective opening spring and the closing spring, such a spring could include a set of springs. Another mechanism converts the motion of the springs into a translation movement of the mobile contact. In its closed position in a network the mobile contact and the stationary contact of the circuit breaker are in contact with each other and the opening spring and the closing spring of the operating device are charged. Upon an opening command, the opening spring opens the circuit breaker, separating the contacts. Upon a closing command the closing spring closes the circuit breaker and, at the same time, charges the opening spring. The opening spring is now ready to perform a second opening operation if necessary. When the closing spring has closed the circuit breaker, the electrical motor in the operating device recharges the closing spring. This recharging operation takes several seconds.

Illustrative examples of spring operated actuators for a circuit breaker can be found e.g. in U.S. Pat. Nos. 4,678,877, 5,280,258, 5,571,255, 6,444,934 and 6,667,452.

At actuation of the switching apparatus, the moving contact part thereof is brought to a very high speed in order to break the current as fast as possible. At the end part of the movement it is important to decelerate the movement to avoid impact shocks. Therefore actuators of the kind in question normally are equipped with some kind of dampers to slow down the speed of the moving contact at the end of its movement. One damper is provided for the opening and one for the closing. Normally the dampers are linear with a piston operating in a hydraulic cylinder.

Such a damper is space-consuming and requires a plurality of components to be connected to the drive mechanism of the actuator.

In order to overcome such drawbacks and to provide a damper for the closing that requires small space and few components, EP 2317530 suggests using a rotary air damper for damping the closing. The device according to this disclosure thereby is more reliable and precise.

Although the operation of the device according to EP 2317530 has been shown to operate more reliable and precise than traditional devices of this kind, it has been found that the behavior of the damper at the end of the actuating stroke is critical for a proper performance. The air trapped within the working chamber after the displacement wall has passed the air outlet builds up a very high pressure when the sealing is good, which might cause back-bouncing of the displacement wall with operation failure as a consequence. This is explained more in detail in the specific part of the description.

In order to avoid such disastrous over pressure it is known to arrange a relief valve in the displacement wall or in the stationary end wall or both, which relief valve opens air passage through the displacement wall and/or the stationary end wall when a certain over-pressure is exceeded. Providing such a valve, however adds to the complexity of the device and increases assembly time and cost. A risk of failure is also introduced.

Another known solution is to control the damping behavior at the end of the stroke by having a pattern of holes that are closed successively. This controls the air flow and thereby the build-up pressure. The disadvantage of this method is that there is always flow through the open holes until they are closed. This leads to a slower pressure build-up and therefore results in a larger stroke angle to reach the turn-around point.

SUMMARY

The object of the present invention is to improve a device of the kind disclosed in EP 2317530 in order to overcome the drawback related thereto. In particular, the object is to avoid or reduce back-bouncing at the end of the dampening in a way that eliminates the drawbacks related to solutions according to prior art.

This object is according to the invention achieved in that a spring operated actuator of the kind specified in the preamble of claim 1 includes the specific features specified in the characterizing portion of the claim. Thus, according to the invention, the second housing part is provided with a recess in its internal walls, which recess is located less than 90° ahead the end wall as seen is the rotational direction of the displacement wall at an actuating movement, and which recess has an extension in the circumferential direction that is larger than the effective thickness of the displacement wall. A recess may alternatively or complementary be provided in the internal walls of the first housing part in which case it is located less than 90° ahead of the end wall and has an circumferential extension that is larger than the effective thickness of the end wall.

For constructional and manufacturing reasons it is preferred that the recess is provided only in the second housing part. The following description will be focused on that embodiment. However, the "mirror embodiment", when the recess is provided in the first housing part, is easily understandable for the skilled person by this description.

Since the damping operation is more accurate in a device according to the invention, the actuating spring may be larger and stronger allowing application of the actuator for switching apparatuses at higher voltages.

The term "effective thickness" is to understand as the circumferential extension of the displacement wall at its edges where it slides on the internal walls of the stationary housing part. It might be the case that the displacement wall is provided with edges that for sealing purpose are wider in the circumferential direction than the thickness of the wall as such. It might also be the case that the wall thickness is as smallest at its edges.

Terms like "circumferential," "radial," etc., in this application refer to the rotational axis of the rotary air damper and the aligned axis of the spring if not explicitly expressed otherwise. "Inner" and "outer" refer to the radial direction. "Lateral" is defined by a direction parallel to the rotational axis.

With the term "end" related to a helical torsion spring is in this application meant the end of the spring material, i.e., the end in the direction of the spring helix. For the ends in the axial direction the term "axial end" is used.

According to a preferred embodiment of the invention, the actuation spring is a closing spring and the actuating movement is a closing movement.

Although the invented actuator may be employed also for an opening spring, the application to the closing spring is of highest importance.

According to a further preferred embodiment, the recess has an extension in the circumferential direction that is longer than its extension in the direction perpendicular to the circumferential direction.

Normally the width in the perpendicular direction—i.e., in the radial direction if the recess is on the side wall of the working chamber or in the lateral direction if the recess is on the radially outer or inner wall of the working chamber—is not decisive for obtaining a proper leakage pattern with respect to the timing. A relatively small width is normally sufficient. The extension in the circumferential direction, however, has large impact in that respect. Normally it should be relatively large in order to obtain a sufficient time duration and control of the leakage for obtaining an optimal effect against back-bouncing. Arranging the recess to be longer in the circumferential direction is thus an advantageous adaption to this aspect.

According to a further preferred embodiment, the recess has an extension in the circumferential direction that is 2-20 times longer than the effective thickness of the displacement wall or the end wall, respectively.

The extension has to be sufficiently long to open communication across the displacement wall a sufficient period of time. However it should not be unnecessarily long in relation to what is required for effectively counter-act the back-bouncing. A length within the specified range normally satisfies these requirements and is therefore preferred. In particular the range 5-10 times longer is preferred.

According to a further preferred embodiment, the recess has an extension in the circumferential direction that is within the range of 5°-90°, preferably within the range of 15°-40°.

With an angular extension within the specified range, the requirements discussed next above will be met. In particular an angular extension in the range of 10°-30° is preferred.

According to a further preferred embodiment, the recess is arranged in a side wall of said internal walls.

Locating the recess in the side wall simplifies the manufacturing with respect to the machining of the recess.

According to a further preferred embodiment, the recess has an elongated extension in the circumferential direction and has the shape of a circular curve around the axis of the toroidal working chamber.

The length extension of the recess thereby is in the same direction as the movement of the displacement wall. This simplifies the tuning of the length and other dimensions of the recess to match an appropriate leakage pattern for the anti-back-bouncing.

According to a further preferred embodiment, the recess has a depth within the range of 0.5 to 5 mm.

The depth needs to be sufficient to provide effective air leakage, but the recess should not be unnecessarily deep. A deeper recess is more costly with regards to manufacturing cost and the need for thicker wall. The leakage process will also be more difficult to calculate and foresee when the recess is deep. The specified range represent an adequate balance between these two considerations.

According to a further preferred embodiment, a plurality of recesses are arranged in the inner walls of the second housing parts.

In some applications there might be a need for a quite substantial air flow to sufficiently counteract the back-bouncing. In such a case the air flow will be better controlled and more precisely tailored if the air flow is created through more than one flow-path. When having a plurality of recesses they may be arranged in parallel for increasing the leakage rate or after each other for increasing the leakage duration. The plurality of recess may include both recesses in parallel and consecutive recesses. When there are a plurality of recesses all of them may be identical or some of them may have design differing from other recesses, or all recesses may be differently designed.

According to a further preferred embodiment, the cross section of the toroidal working chamber is substantially rectangular.

Manufacturing and assembly will thereby be relatively simple, by "substantially rectangular" is to understand that within the scope of protection of this embodiment minor deviations from a pure rectangle may be present, such as e.g., rounded corners.

According to a further preferred embodiment, the recesses are arranged on the side wall, on the radially outer wall and/or on the radially inner wall of said internal walls.

The optimal location of the recesses with regards in which of the wall parts they are arranged may vary in dependence of the characteristics of the application. In some cases recesses may be provided in the side wall as well as on either or both of the radially inner and outer walls.

According to a further preferred embodiment, the recesses overlap each other, at least partly, in the angular direction.

Thereby is achieved that the air leakage will be continuous even if for some reason it has been found appropriate to provide a plurality of circumferentially distributed recesses.

According to the second aspect of the invention, the object is met in that an electrical switching apparatus includes a spring operated actuator according to the present invention, in particular according to any of the preferred embodiments thereof.

The invented electrical switching apparatus have similar advantages as those of the invented actuator and the preferred embodiments thereof, which advantages have been described above.

According to a preferred embodiment of the electrical switching apparatus, it is a circuit breaker.

This is an application, where the advantages of the present invention are particularly useful.

The above described preferred embodiments of the invention are set out in the dependent claims. It is to be understood that further preferred embodiments may be constituted by any possible combination of features of the described preferred embodiments and by any possible combination of features in these with features described in the description of examples below.

DETAILED DESCRIPTION

As initially mentioned, the present invention is an improvement of the device disclosed in EP 2317530 and is closely related thereto. The complete disclosure of EP 2317530 B1 therefor is explicitly incorporated into this application.

The actuator illustrated in FIGS. 1-9 is according to this incorporated disclosure. The description below related to these figures provides the context for a better understanding of the present invention. The description of the prior art relating to FIGS. 1-9 therefore is to be seen as a part of the description of the present invention. Thus features disclosed in these figures and the accompanying description are parts of the description of the present invention, and may serve as a source for claim amendments in the same way as the rest of the present specification.

The description of example therefor is divided into a first part related to FIGS. 1-9 and describes what is common to the present invention and prior art. The first part is headed "Context of the invention". The particulars that are specific to the present invention are described further below under the heading "Specifics for the invention".

Context of the Invention

Figure 1:
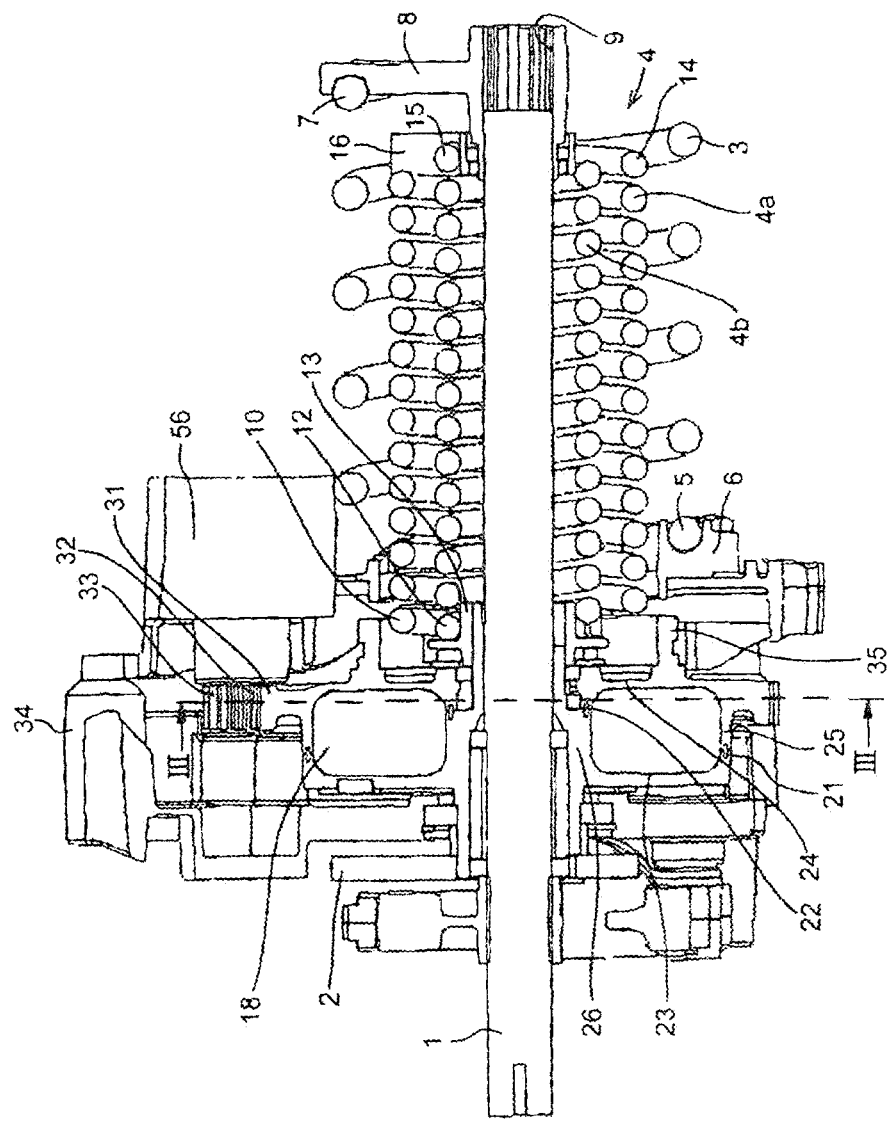
FIG. 1 is an axial section through an example of a spring operated actuator to which the present invention is applied.

FIG. 1 is an axial section through the actuator of a circuit breaker. The actuator has a main shaft 1 and a cam disc 2. The cam disc acts on the transmission rod (not shown) for switching the circuit breaker. The transmission from the cam disc to the circuit breaker and the circuit breaker as such can be of a conventional kind and need no further explanation.

The main shaft is operated by an opening spring 3 and a closing spring 4. Both the springs are helical torsion springs and are coaxial with the main shaft. The opening spring 3 is located radially outside the closing spring 4 and thus has an internal diameter exceeding the external diameter of the closing spring 4.

The opening spring 3 is squeezed between two end fittings, a supporting end fitting 6 at the supported end 5 of the spring and an actuating end fitting 8 at its actuating end 7. The opening spring 3 thus in its charged state is loaded in the direction of its helix, or otherwise expressed the charged opening spring is pressed in its unwinding direction. As a consequence the actuating end 7 is acting with a pushing force on the actuating end fitting 8, which is connected through splines 9 to the main shaft 1.

The closing spring 4 consists of two units, a radially outer unit 4a and a radially inner unit 4b, which both have axes aligned with the axis of the opening spring 3 and with the main shaft 1.

Like the opening spring also the closing spring 4 in its charged state is loaded in the direction of its helix. The outer unit 4a of the closing spring has a supported end 10 and a connection end 14, and the inner part has an actuating end 12 and a connection end 15. The supported end 10 is pressed against a supporting end fitting (not shown) which is mounted on a support flange 35, and the actuating end 12 is pressed against an actuating end fitting 13. The connection ends 14, 15 of the two units 4a, 4b are both pressed against a connection fitting 16, through which the two units are in force transmitting relation to each other.

When the circuit breaker is trigged for an opening action the opening spring 3 pushes its actuation end fitting 8 to rotate and thereby rotate the main shaft 1.

Some 0.3 seconds later the circuit breaker is to be closed. The closing spring 4 thereby is activated such that the actuating end 12 thereof pushes its actuating end fitting 13 to, through a series of cooperating components such as the cam, roller, etc., rotate the main shaft 1 in a direction opposite to that of the opening process to move the actuation rod, thereby closing the circuit breaker. When the main shaft 1 rotates in this direction it will also rotate the actuating end fitting 8 of the opening spring 3 in the same direction such that it pushes the actuating end 7 of the opening spring 3 and the opening spring becomes recharged and prepared for a consecutive opening movement should that be required.

When the closing operation is finished the closing spring is recharged in that its supported end 10 is pushed by its supporting end fitting.

At the ends of the opening and closing movements the movements have to be damped in order to avoid impact shocks at the end of the strokes due to excess of energy.

The opening movement is damped by a conventional linearly acting hydraulic damper 17.

The closing movement is damped by a rotary damper 18 having air as working medium. The rotary damper 18 may have components that are rotatable relative to each other. The rotary damper 18 has a toroidal working chamber that is coaxial with the main shaft 1. The working chamber is formed by a housing having a first side wall 24, a second side wall 23, an outer circumferential wall 25 and an inner circumferential wall 26. The housing is split into two parts, a first part 20 and a second part 19. The two parts are rotatable relative to each other and are connected by an outer circumferential seal 21 and an inner circumferential seal 22.

The second part 19 is drivingly connected to the actuating end fitting 13 of the inner unit 4b of the closing spring 4 and thus rotates together with the cam disc 2 at closing. The first part 20 on its outside has an axially extending flange 35 on which the supporting end fitting of the outer unit 4a of the closing spring 4 is mounted.

Figure 3:
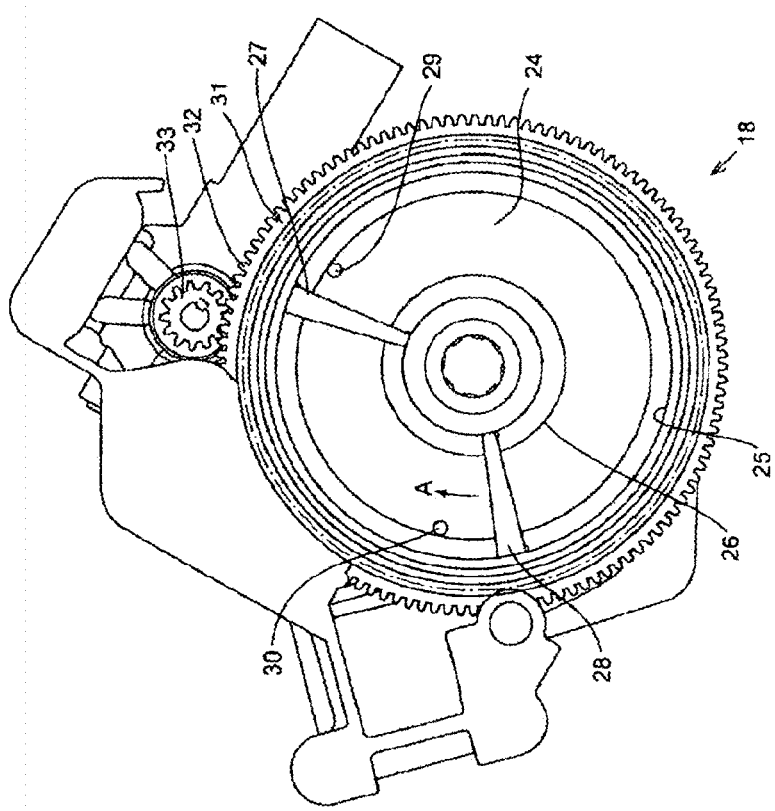
FIG. 3 is a section along line III-III in FIG. 1.

The operation of the closing damper is explained with reference to FIG. 3 which is a radial section through the damper in the direction towards the first part 20. During the closing movement the first part 20 is stationary and the second part 19 (not visible in FIG. 3) is rotating in direction of arrow A, defined as the rotational direction of the damper.

A disc-like body is attached to the first side wall 24, which forms a radial end wall 27. A corresponding disc-like body is attached to the second side wall 23 and forms a displacement body 28. Each of the end wall 27 and the displacement body 28 are sealingly cooperating with the side walls 23, 24 and the circumferential walls 25, 26 of the working chamber.

The first side wall has a first 29 and second 30 orifice there through to act as inlet and outlet respectively for air.

The inlet orifice 29 is located shortly after the end wall 27 as seen in the rotational direction of the damper. The outlet orifice 30 is located about a right angle ahead of the end wall 27.

When the closing spring is charged and in condition for initiating a closing movement the displacement body 28 is located closed to the end wall 27 on its right side as seen in the figure, i.e., in the area of the inlet orifice 29. The second part 19 of the housing is, via a series of components, drivingly connected with the main shaft.

When a closing movement occurs the displacement body 28 will move from its initial position adjacent the end wall 27 since it is connected to the second side wall 23, and rotate in the direction of arrow A until it has made an almost complete turn and reaches the left side of the end wall 27. During its rotation air will be sucked in through the inlet orifice 29. And during the major part of the turn air will be pressed out through the outlet orifice 30.

After the displacement body has passed the outlet orifice 30 air will be trapped between the displacement body 28 and the end wall 27. Further rotation will compress the trapped air. Thereby an increasing counterforce against the rotation develops and some air leakage will occur along the sealing lines between the end wall 27 and the walls of the housing and between the displacement body 28 and the walls. Thereby the damping effect is achieved.

Normally the air leakage around the end wall and the displacement body is sufficient to attain a damping that is properly balanced between overdamping and underdamping. In case the seals are very effective a proper air leakage can be attained by providing a small leakage hole through the end wall 27 or through the displacement body 28.

Figure 4:
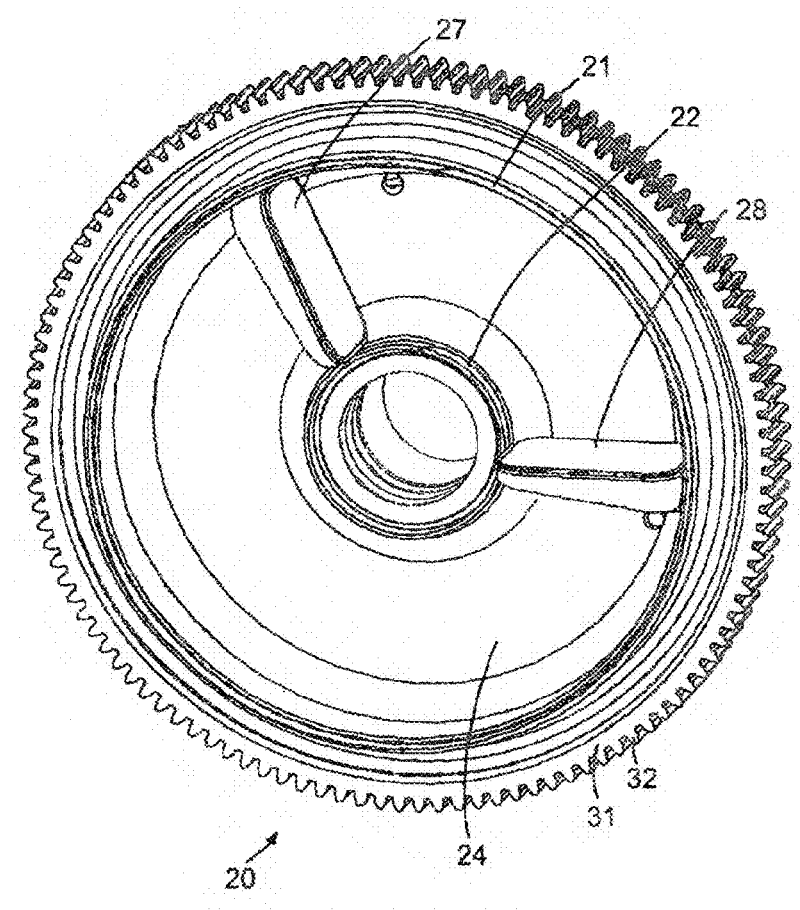
FIG. 4 is a perspective view of a detail of FIG. 3.

FIG. 4 is a perspective view of the first part of the housing of the closing damper.

The mechanism for charging the closing spring 4 is partly integrated with the closing damper 18. The first part 20 of the damper is externally shaped as a gear wheel 31 with external radially projecting teeth 32. The gear wheel 31 cooperates with a pinion 33 driven by an electric motor via a gear box 56. At charging, the pinion 33 drives the first part 20 of the damper 18 in the direction of arrow A (FIG. 3 about one complete turn. The end wall 27 thereby moves to a position immediately to the left of the displacement body 28. The end wall 27 and the displacement body thus will reach a position relative to each other as described above when the closing movement starts.

Figure 2:
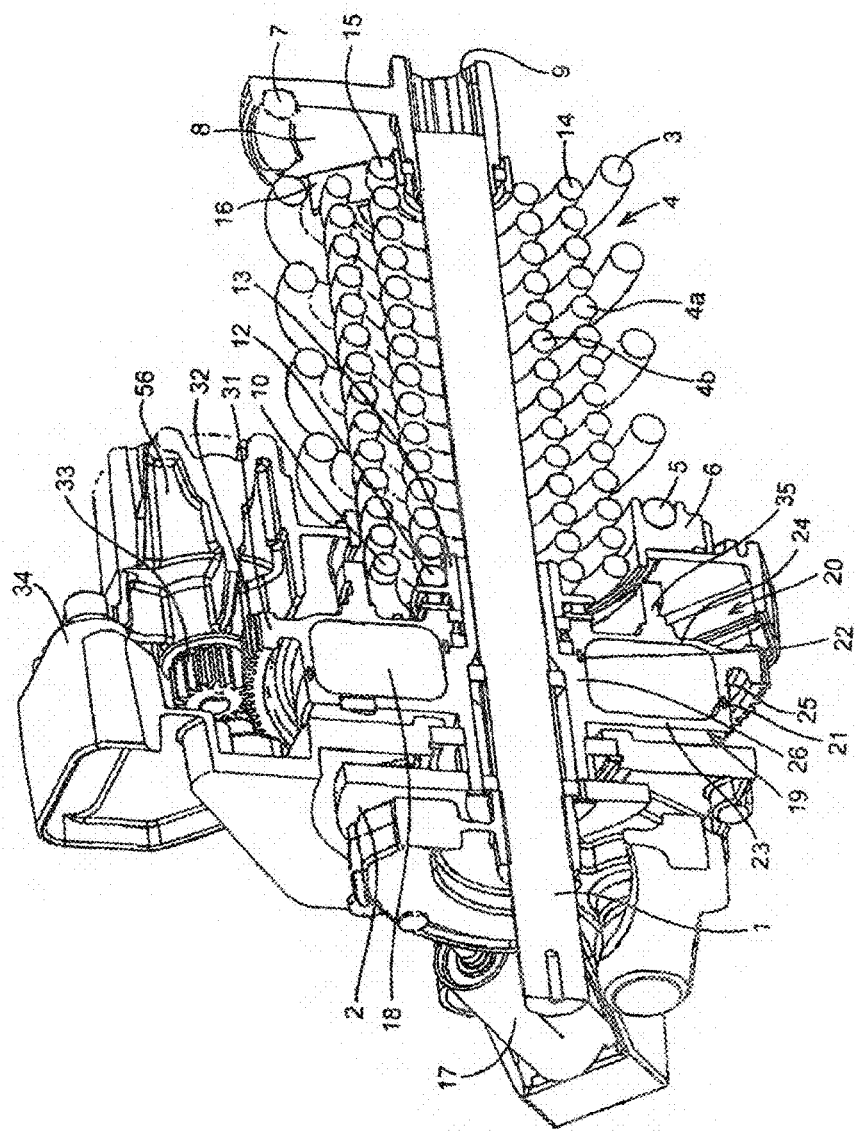
FIG. 2 is a perspective view of the section of FIG. 1.

The first part 20 of the damper 18 is through the flange 35 (FIGS. 1 and 2 drivingly connected to the supporting end fitting 11 of the outer unit 4a of the closing spring 4.

When the first part 20 rotates, the supporting end fitting of the outer unit 4a of the closing spring will follow its rotation since it is mounted on the axial flange 35 extending rearwards from the first part 20 of the damper 18. Thereby the closing spring is helically loaded to its charged state.

Figure 5:
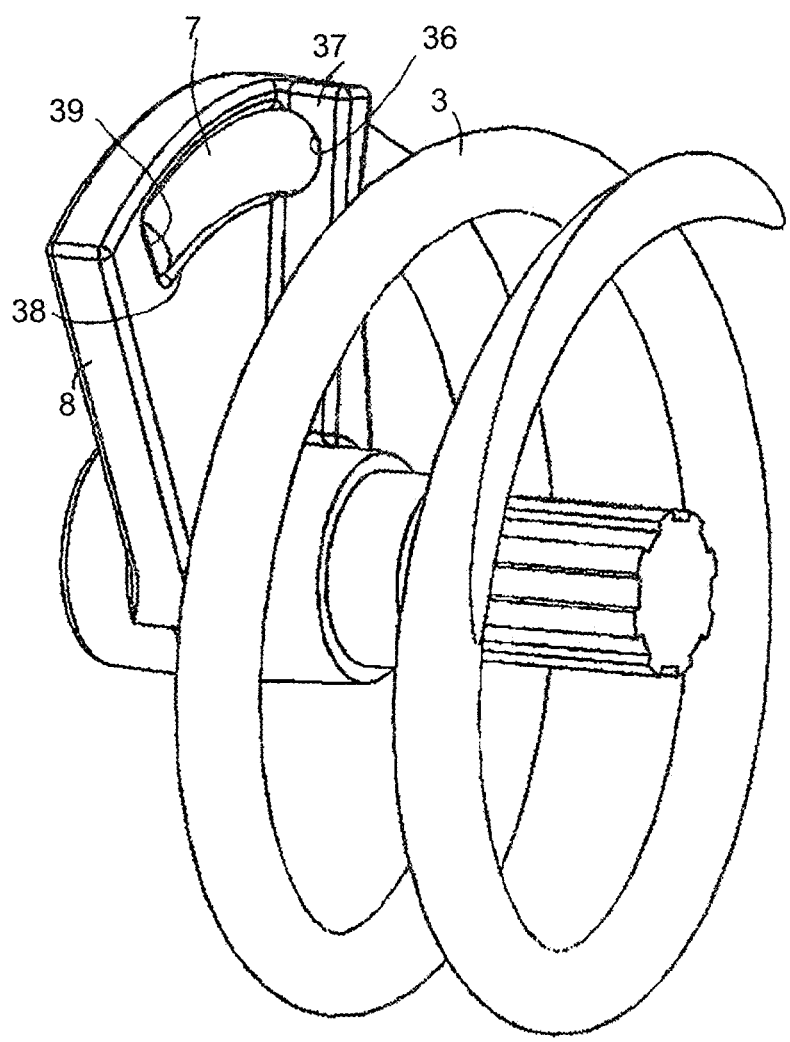
FIG. 5 is a perspective view of a detail of the spring operated actuator of FIGS. 1-4.

FIG. 5 is a perspective view of the end fitting 8 of the opening spring 3 as seen from the spring towards the end fitting. The actuating end 7 of the opening spring 3 extends through a hole 36 in a flange 37 forming a part of the end fitting 8. A depression 38 in the end fitting 8 guides the actuating end 7 against an abutment surface 39. The other end fittings may have a similar construction.

Figure 6:
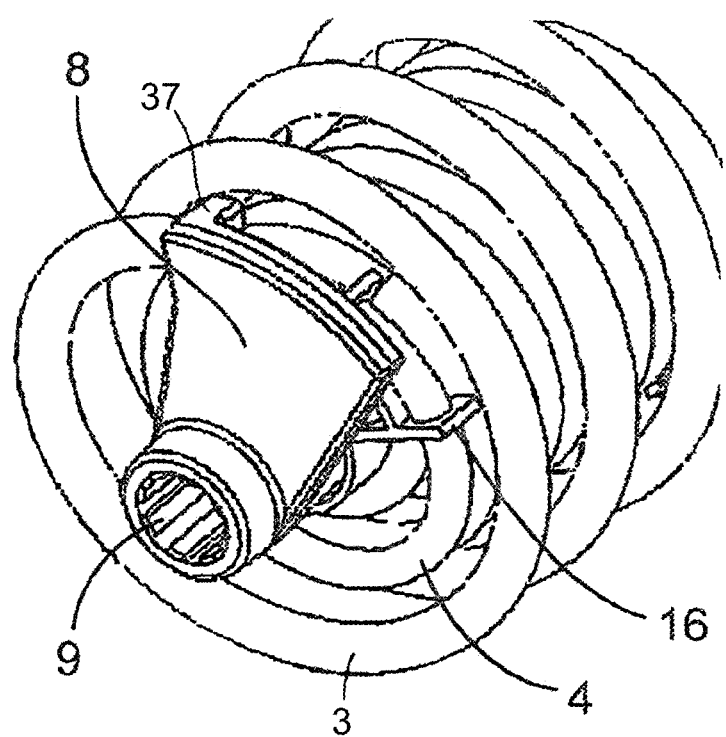
FIG. 6 is a perspective view of the detail in FIG. 5 from another direction.

FIG. 6 illustrates the actuating end fitting 8 of the opening spring 3 from another direction. Also the connection end fitting 16 of the units 4a and 4b is partly visible there behind.

Figure 7:
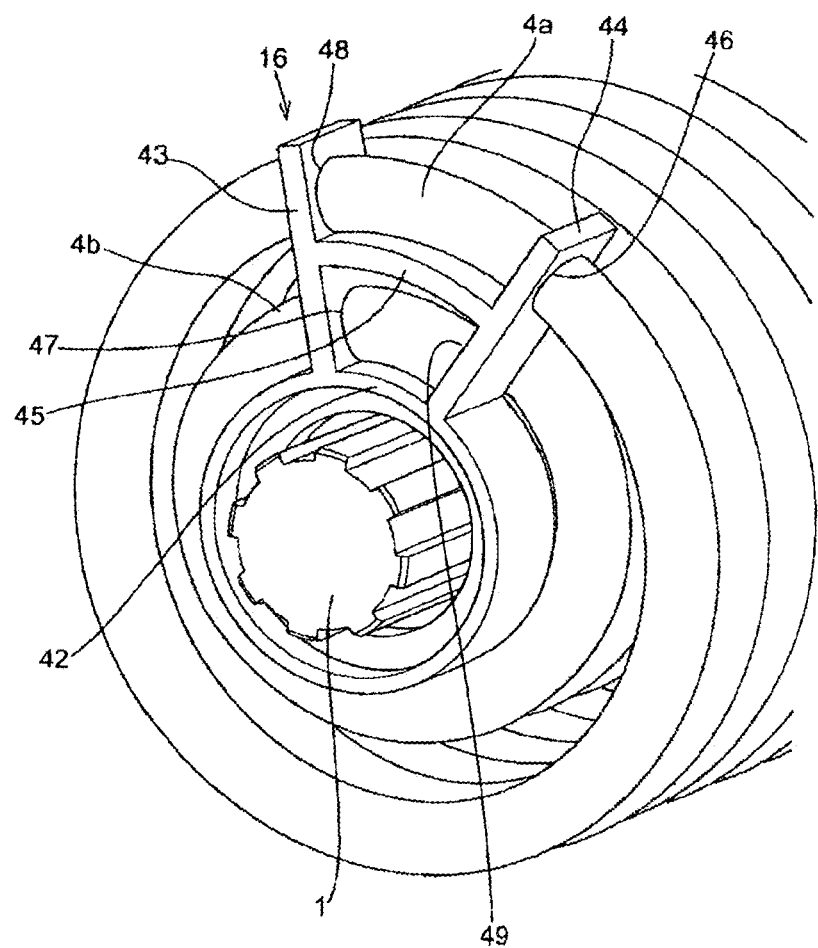
FIG. 7 is a perspective view of a further detail of the spring operated actuator of FIGS. 1-6.

FIG. 7 illustrates the connection end fitting 16 more in detail. It consists of an inner ring 42 from which a first 43 and a second 44 abutment flange extend radially outwards at an angular position relative to each other of about 45-60°. At the radial middle of the abutment flanges 43, 44 a circular wall 45 interconnects them, which circular wall is coaxial with the inner ring 42. The first abutment flange 43 has an abutment surface 48 at its radially outer part and a hole 47 through its inner part. Correspondingly the second abutment flange 44 has a hole 46 through its outer part and an abutment surface 49 on its inner part.

The inner closing spring unit 4b extends through the hole 47 of the first flange 43, and its end abuts the abutment surface 49 of the second flange 44. Correspondingly the outer closing spring unit 4a extends through the hole 46 of the second flange 44, and its end abuts the abutment surface 48 of the first flange 43. A pushing force from the outer closing spring unit 4a thereby is transmitted to the inner closing spring unit 4b. The end portions of the closing spring units 4a, 4b are guided against its respective abutment surface 48, 49 by the holes 46, 47, the ring 42 and the circular wall 45. The end portions thereby can be loosely fitted into the connection end fitting 8 and no further attachment means is required.

Figure 8:
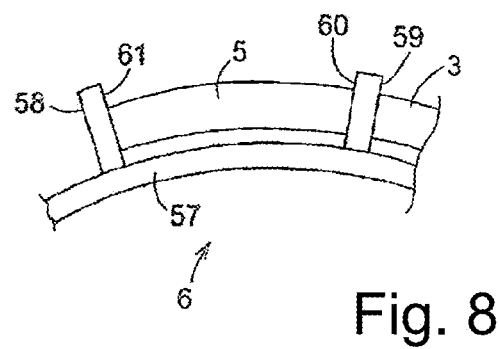
FIG. 8 is a side view of a part of a detail of FIGS. 1-4 according to an alternative example.

An alternative construction of the end fittings is illustrated in FIG. 8. In FIG. 8 a part of the supporting end fitting 6 for the opening spring 3 is schematically illustrated. The supported end portion 5 of the opening spring 3 has an end surface against an abutment surface 61 on a radial flange 58 of the end fitting 6. A holding device is formed by a second radial flange 59 and a circumferential part 57 connecting the two flanges 58, 59. The second radial flange 59 has a hole 60 there through and the opening spring extends through this hole 60 such that its end portion 5 is directed towards the abutment surface 61. The other end fittings may have a similar construction.

Figure 9:
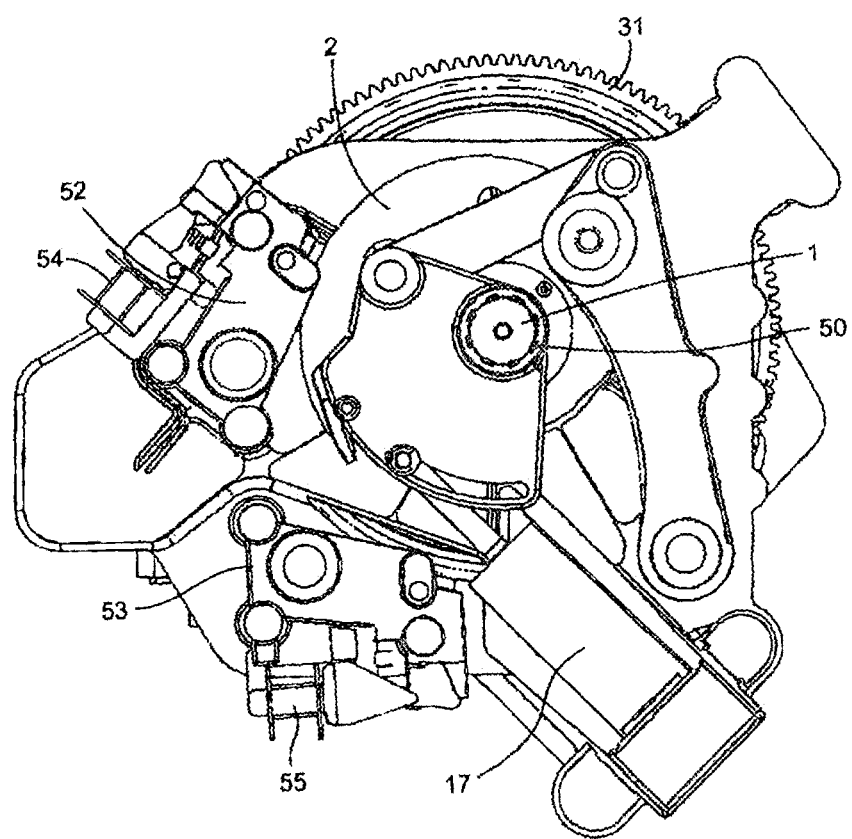
FIG. 9 is an end view of the spring operated actuator as seen from the left of FIG. 1.

FIG. 9 is an end view of the spring operated actuator as seen from the left in FIG. 1. The cam disc 2 is drivingly connected to the main shaft 1 through splines 50. Latch mechanisms 52, 53 with a respective trigging coil 54, 55 control the opening and closing movements of the actuator. In the left part of the figure the oil damper 17 for the opening spring is visible, and to the left a part of the gear wheel 31 for charging the closing spring can be seen.

Specifics of the Invention

Figure 10:
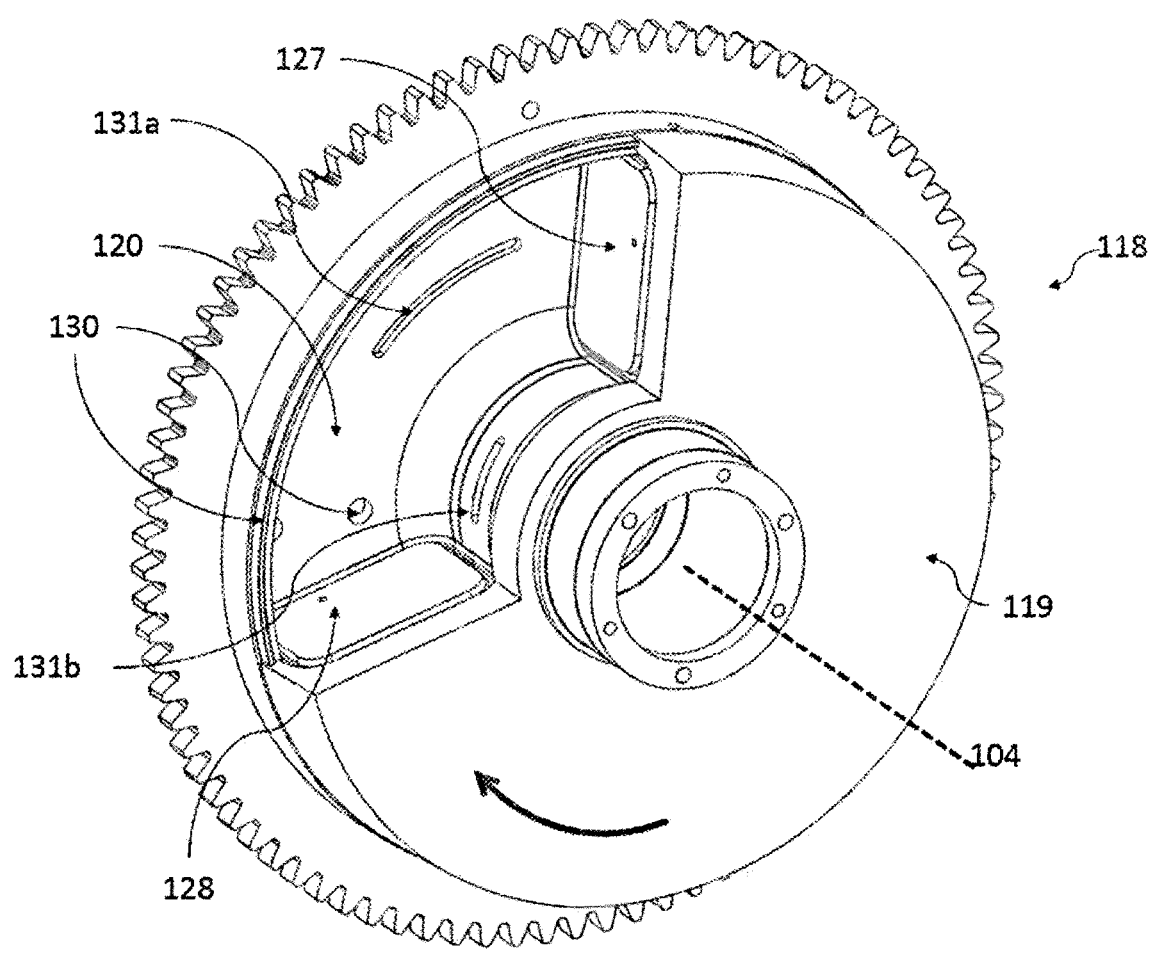
FIG. 10 is a perspective view of a damper according to an example of the invention.

FIG. 10 is perspective view of the rotary air damper 118 according to the present invention, which damper is mechanically connected to a closing spring 104, schematically indicated in the figure. The closing spring may be of the kind described above in relation to FIGS. 1 and 2. The working chamber of the damper is formed by two housing parts 119, 120 rotatable relative each other. The first housing part 119 rotates in the direction of the arrow and has a displacement wall 128 attached thereto. A part of the first, rotating housing part 119 is left away from the figure for illustrative clarity. The second housing part 120 is stationary and has an end wall 127 attached thereto.

The figure illustrates the position at the end of the closing stroke of a breaker. During the closing stroke the compressed air is discharged through the outlets 130. Shortly after the displacement wall 128 has passed the outlets 130, the air will be trapped and compressed between the displacement wall 128 and the stationary end wall 127. The pressure developed in the closed chamber decelerates the rotation and thereby dampens the movement at the end of the stroke.

During the last portion of the damping stroke a very high pressure will be developed in the closed chamber between the displacement wall 128 and the end wall 127. If no measures have been taken in order to relief the pressure the high pressure may cause back-bouncing, which may give rise to problems.

Figure 11:
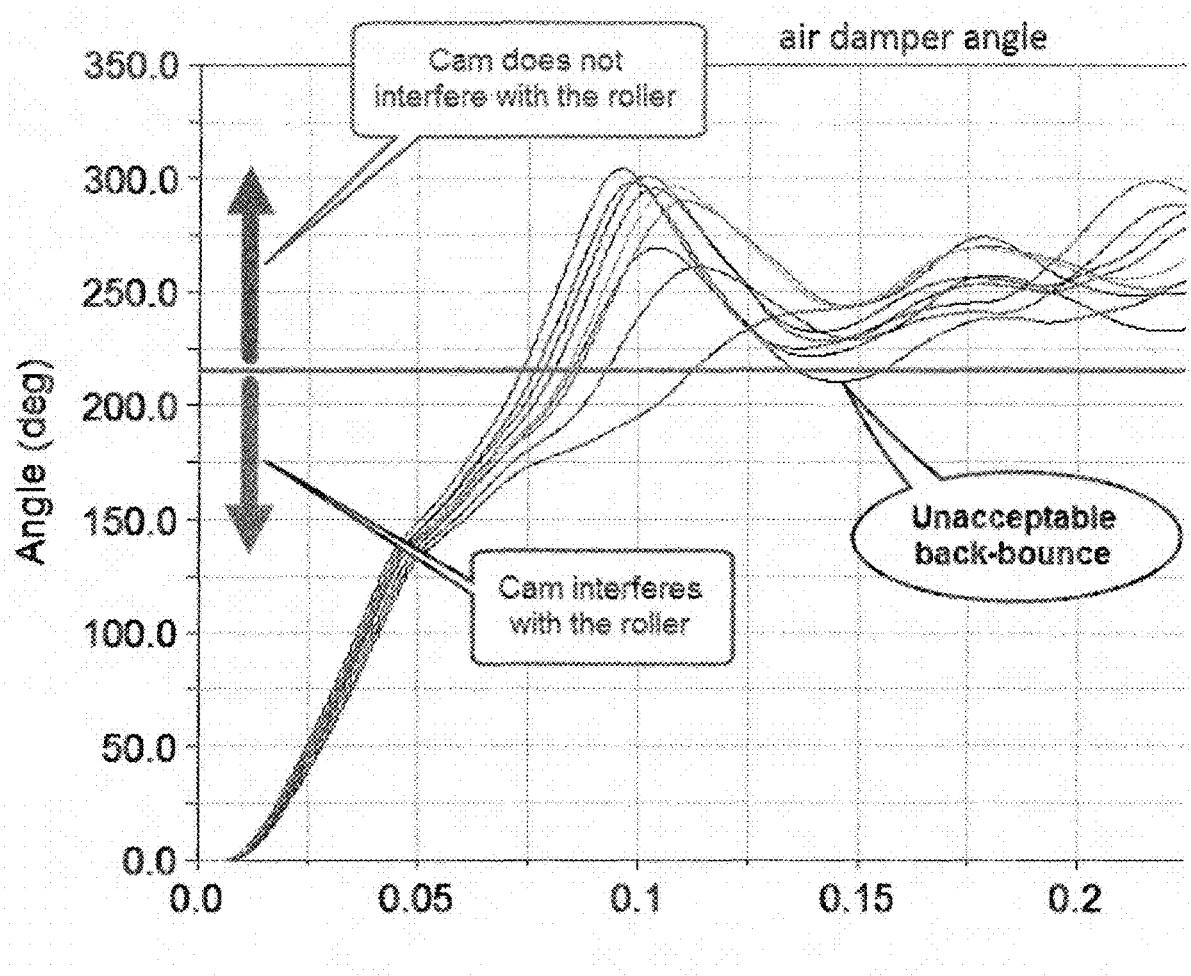
FIG. 11 is a diagram illustrating the problem, which is solved by the present invention.

FIG. 11 is a diagram illustrating the back-bouncing problem. The diagram shows the angular position of the displacement wall 128, where the angle is counted from its starting position close to the right side of the stationary end wall 127 as viewed in FIG. 10. The angular position is shown as a function of the time from the start of the movement from that position.

In the diagram a number of test movements are illustrated by the curves for a damper without relief means. As can be seen there is a rapid and almost uniform movement until the displacement wall 128 reaches the angular position of 300°. The position of the outlets in this case is about 190° from the starting position. The strong pressure that develops after closing results in that the displacement wall 128 bounces angularly backwards. The various tests show a back-bouncing to positions between 210° and 245°. The actuating movements of the actuator are controlled by a cam 2 (see FIG. 1) cooperating with a roller (not shown). If the back-bouncing is high it may cause the cam to move under the roller again. If this happens, it prevents the drive from being able to perform an opening operation. The straight horizontal line at angular position 215° indicates the acceptable limit of the back-bouncing for avoiding that problem. Back-bouncing to an angular position above that line normally will not create any interference between cam and roller. Back-bouncing to a position below that line, however, will face this problem.

Returning now to FIG. 10, it is explained how recess 131a solves the back-bouncing-problem according to the invention. The recess 131a is shaped as a circular groove in the side wall of the stationary housing part 120. The groove starts at a position after the displacement wall 128 has passed the outlets 130. Somewhat later the displacement wall 128 would have started to bounce back if no groove was present, but by the relief through the groove bouncing is eliminated or at least reduced. By the groove 131a a leakage path is formed across the displacement wall 128 providing a relief of the pressure otherwise trapped between the displacement wall 128 and the end wall 127. The leakage reduces the counter-force against the movement of the displacement wall 128 such that back-bouncing is eliminated or at least reduced to an acceptable level.

In the figure there is a second recess or groove 131b in the radially inner wall of the stationary housing part 120. This position may be an alternative to the position of groove 131a or a complement to it.

From FIG. 10 it is easily conceived how it works when the recess is located in the first housing part. The groove may in that case be on the inside of the part of the wall that is left away in the figure and be positioned such that when the displacement wall 128 reaches a bit further than the illustrated position, the recess will bridge the end wall 127. Thereby the trapped volume between the displacement wall 128 and the end wall 127 will be released by the communication established with the low pressure side on the (in the figure) right side of the end wall 127.

Figure 12:
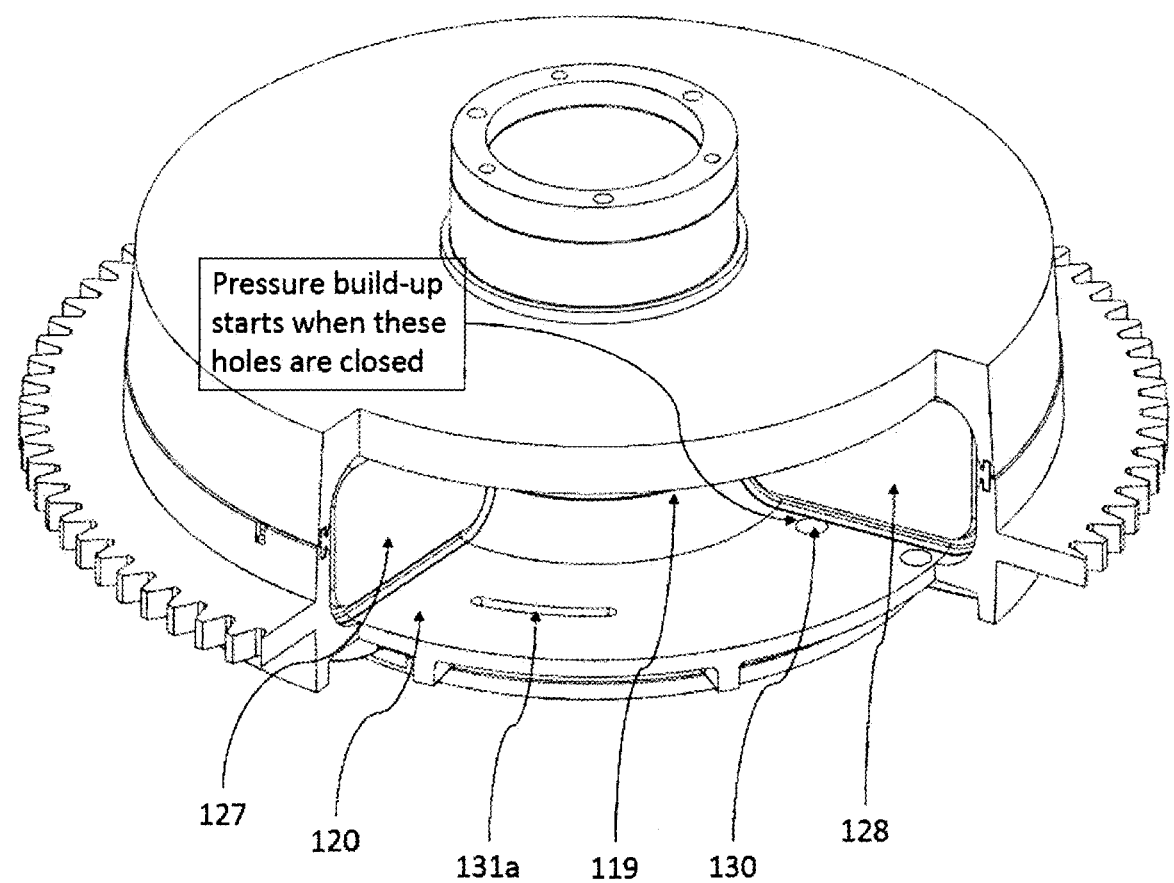
FIGS. 12-14 are perspective views of a detail of the damper of FIG. 10.
Figure 13:
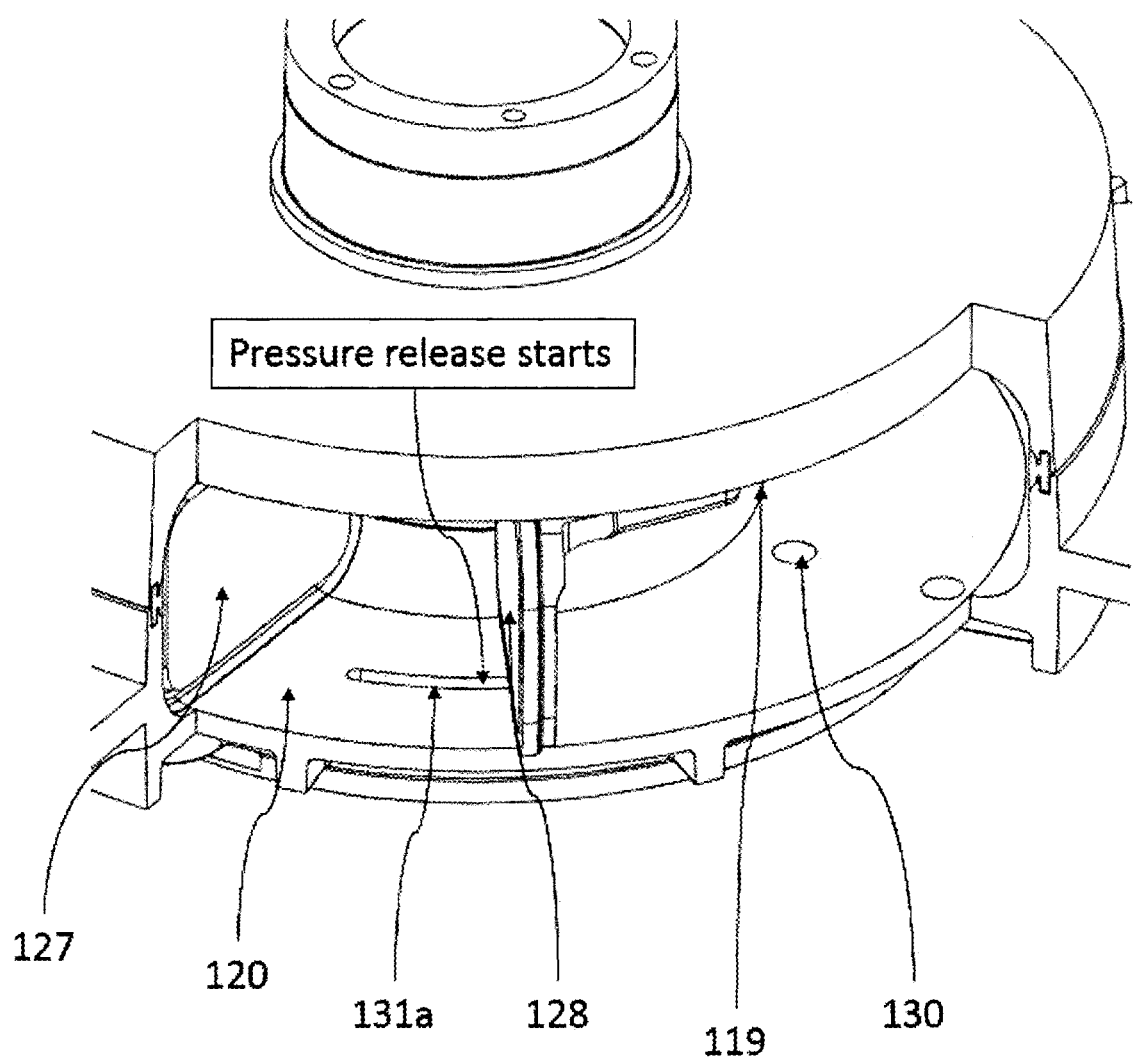
Figure 14:
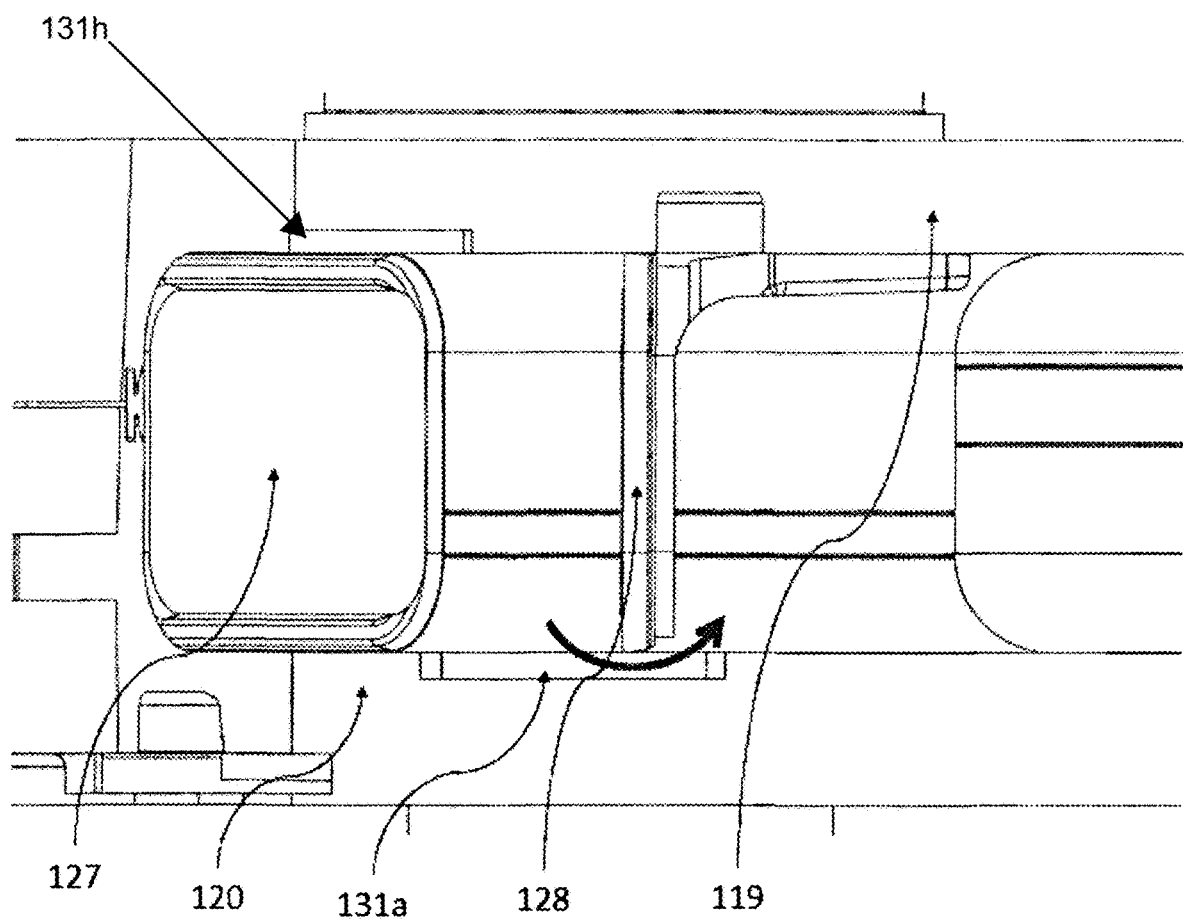

FIGS. 12 and 13 illustrate the movement of the displacement wall 128 at the end of the damping. In FIG. 12 the displacement wall 128 passes the outlets 130 and the pressure starts to be built up in the closed chamber. In FIG. 13 the displacement wall 130 has reached the groove 131a and air will leak through the groove 131a from the closed chamber at the left side of the displacement wall 128 to its other side. This leakage is further illustrated in FIG. 14. FIG. 14 also illustrates a recess 131h formed in the side wall of the first housing part 119.

Figure 15:
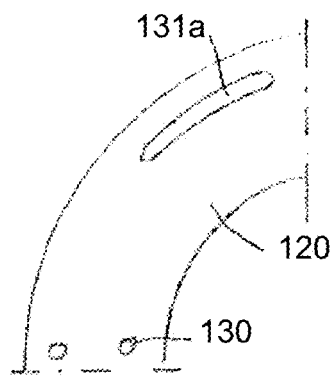
FIGS. 15-18 illustrate various alternative examples of a detail of the invention.

FIG. 15 illustrates a groove 131a in the side wall having an angular extension of 30°, and which ends about 5° ahead of the end wall 127.

Figure 16:
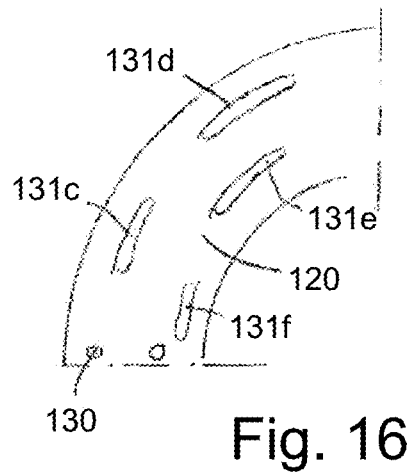

FIG. 16 illustrates an example with a plurality of grooves 131c-f, which are angularly and radially distributed and partly overlap each other.

Figure 17:
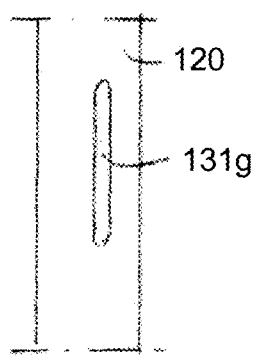

FIG. 17 illustrates a groove 131g in the outer wall of the stationary housing part 120. This may be an alternative or a complement to a groove in the side wall.

Figure 18:
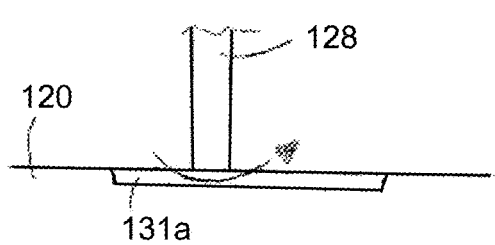

FIG. 18 shows an example where the depth of the groove 131a is about 2 mm and the length is about 10 times the effective thickness of the displacement wall 128.

Figure 19:
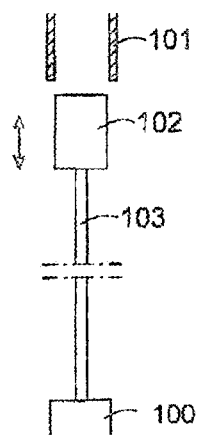
FIG. 19 is a schematic side view of a circuit breaker.

FIG. 19 schematically illustrates a circuit breaker where the movable contact part 102 is brought into and out of contact with the stationary contact part 101 by a rod 103 actuated by a spring operated actuator 100 according to the present invention. For a three phase breaker the actuator 100 can be arranged to simultaneously move the movable contact part 102 of each phase.

The invention claimed is:

1. A spring operated actuator for an electric switching apparatus including an actuation spring to provide an actuating movement of the switching apparatus and a rotary air damper connected to the actuation spring, the damper is arranged to decelerate the spring movement during at least an end portion of the actuating movement, the damper having a toroidal working chamber formed by first and second circumferential housing parts which are rotatable relative to each other, each housing part having internal walls which together define the working chamber, the first housing part having a rotatable displacement wall, sealingly rotatable in said working chamber, the second housing part having a stationary end wall of the working chamber, wherein at least one of said housing parts is provided with at least one recess in its internal walls, the recess when provided in the second housing part is located less than 90° ahead the end wall as seen is the rotational direction of the displacement wall at an actuating movement, and the recess in the second housing part has an extension in the circumferential direction that is larger than the effective thickness of the displacement wall, and the recess when provided in the first housing part is located less than 90° ahead the displacement wall as seen in the rotational direction of the displacement wall at an actuating movement, and the recess in the first housing part has an extension in the circumferential direction that is larger than the effective thickness of the end wall.

2. The spring operated actuator according to claim 1, wherein said actuation spring is a closing spring and said actuating movement is a closing movement.

3. The spring operated actuator according to claim 1, wherein said recess has an extension in the circumferential direction that is longer than its extension in a direction perpendicular to the circumferential direction.

4. The spring operated actuator according to claim 1, wherein said recess has an extension in the circumferential direction that is 2-20 times longer than the effective thickness of the displacement wall or the end wall.

5. The spring operated actuator according to claim 1, wherein said recess has an extension in the circumferential direction that is within the range of 5°-90°.

6. The spring operated actuator according to claim 1, wherein said recess is arranged in a side wall of said internal walls.

7. The spring operated actuator according to claim 1, wherein the recess has an elongated extension in the circumferential direction and has the shape of a circular curve around the axis of the toroidal working chamber.

8. The spring operated actuator according to claim 1, wherein the depth of the recess is within the range of 0.5 to 5 mm.

9. The spring operated actuator according to claim 1, wherein a plurality of recesses are arranged in the internal walls of said at least one of housing parts.

10. The spring operated actuator according to claim 1, wherein the cross section of the toroidal working chamber is substantially rectangular.

11. The spring operated actuator according to claim 9, wherein the recesses are arranged on the side wall, on the radially outer wall and/or on the radially inner wall of said internal walls.

12. The spring operated actuator according to claim 9, wherein the recesses overlap each other, at least partly, in the angular direction.

13. An electrical switching apparatus including a spring operated actuator to provide an actuating movement of the switching apparatus and a rotary air damper connected to the actuation spring, the damper is arranged to decelerate the spring movement during at least an end portion of the actuating movement, the damper having a toroidal working chamber formed by first and second circumferential housing parts which are rotatable relative to each other, each housing part having internal walls which together define the working chamber, the first housing part having a rotatable displacement wall, sealingly rotatable in said working chamber, the second housing part having a stationary end wall of the working chamber, wherein at least one of said housing parts is provided with at least one recess in its internal walls, the recess when provided in the second housing part is located less than 90° ahead the end wall as seen is the rotational direction of the displacement wall at an actuating movement, and the recess in the second housing part has an extension in the circumferential direction that is larger than the effective thickness of the displacement wall, and the recess when provided in the first housing part is located less than 90° ahead the displacement wall as seen in the rotational direction of the displacement wall at an actuating movement, and the recess in the first housing part has an extension in the circumferential direction that is larger than the effective thickness of the end wall.

14. The electrical switching apparatus according to claim 13, wherein the switching apparatus is a circuit breaker.

15. The spring operated actuator according to claim 1, wherein said recess has an extension in the circumferential direction that is 5-10 times longer than the effective thickness of the displacement wall or the end wall, respectively.

16. The spring operated actuator according to claim 2, wherein said recess has an extension in the circumferential direction that is longer than its extension in a direction perpendicular to the circumferential direction.

17. The spring operated actuator according to claim 1, wherein said recess has an extension in the circumferential direction that is within the range of 15°-40°.

18. The spring operated actuator according to claim 2, wherein said recess is arranged in a side wall of said internal walls.

19. The spring operated actuator according to claim 11, wherein the recesses overlap each other, at least partly, in the angular direction.

* * * * *